Figure 1:
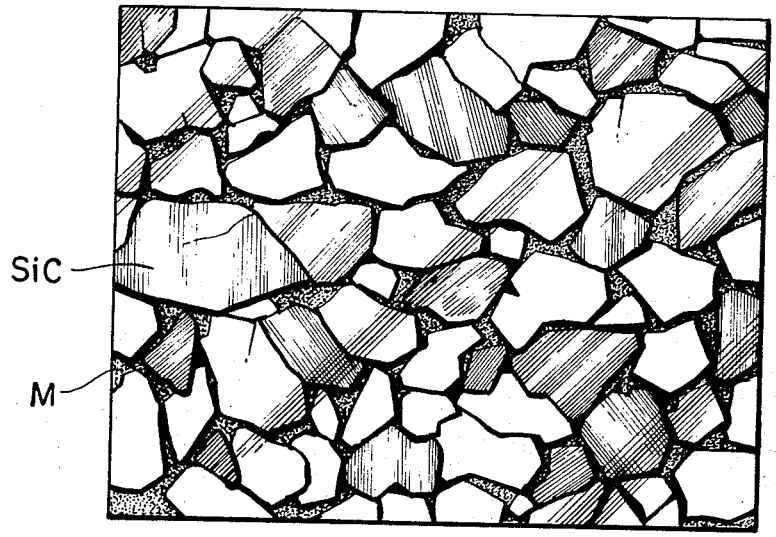

United States Patent

Allen

[15] 3,661,662
[45] May 9, 1972

[54] COMPOSITE MATERIALS WITH FLAKE REINFORCEMENT

[72] Inventor: Lloyd R. Allen, Belmont, Mass.
[73] Assignee: National Research Corporation, Newton Highlands, Mass.
[22] Filed: Apr. 16, 1970
[21] Appl. No.: 28,232

Related U.S. Application Data

[63] Continuation of Ser. No. 630,725, Apr. 13, 1967, abandoned.

[52] U.S. Cl..............................156/62.2, 156/289, 156/372, 161/162, 161/168, 264/112, 264/113, 264/298
[51] Int. Cl..............................................................B32b 5/16
[58] Field of Search..................161/87, 158, 162, 163, 168, 161/184; 156/62.2, 289; 264/109, 112, 113, 128, 298; 260/37 EP; 51/298; 23/208; 252/62.3 C

[56] References Cited

UNITED STATES PATENTS

| 796,545 | 8/1905 | Watson | 161/87 |
| 3,025,195 | 3/1962 | Lowe | 292/336.3 |
| 3,070,866 | 1/1963 | Kastenbein | 264/298 |
| 3,089,196 | 5/1963 | Knapp et al. | 264/112 |
| 3,226,214 | 12/1965 | Daniels et al. | 51/298 |
| 3,254,150 | 5/1966 | Rogers, Jr. | 174/17 |
| 3,273,984 | 9/1966 | Nelson | 51/296 |

Primary Examiner—John T. Goolkasian
Assistant Examiner—George W. Moxon, II
Attorney—Kenneth W. Brown, Arthur S. Collins, Barry R. Blaker and Lawrence A. Chaletsky

[57] ABSTRACT

Silicon carbide or boron carbide flakes are floated on a liquid bath, fixed into a sheet and formed into sheet laminates useful as high modulus structural composites. This assures a planar orientation and high packing factor of the reinforcing flake in the composite.

2 Claims, 2 Drawing Figures

COMPOSITE MATERIALS WITH FLAKE REINFORCEMENT

This application is a continuation of U.S. application Ser. No. 630,725, filed Apr. 13, 1967 and now abandoned.

This invention relates to structural composites of the type involving a matrix material with reinforcing materials particularly of the type utilizing a reinforcing material of extremely high strength and modulus of elasticity, such as silicon carbide.

The prior art has principally concentrated on boron wire reinforcement in plastic matrix.

It is the object of the present invention to provide a new structural composite utilizing higher modulus materials than boron-silicon carbide or boron carbide.

In general, this is accomplished by resorting to a flake reinforced composite. This allows utilization of these high modulus materials with an economically produced raw material form. The nearest related prior art to this approach is the mica flake or glass flake reinforced composite material now commercially available. However, a direct usage of the product configuration of these mica and glass composites, or the technology of manufacture thereof, will not do. This is because the packing and orientation factors obtainable in this technology are inadequate for purposes of high modulus silicon carbide composites or the like.

It is therefore a further and more specific object of the invention to provide a structural composite utilizing a high modulus reinforcement with high packing factor of reinforcement.

This is in general accomplished by forming sheets of flake of essentially single flake thickness closely interlocked in jigsaw puzzle fashion. The sheets are then laminated to each other to form a laminate structural composite. However, hand lay-up of the jigsaw puzzle is too slow. For instance an eight layer composite (1 by 3 inches) of this type made manually under my direction took two man weeks to make.

It is therefore a further object of this invention to provide a method of rapidly and economically making the above described single flake thickness sheets on a production line basis without the tedious manual effort of jigsaw puzzle solving.

This is generally accomplished by floating the flake on a liquid metal to obtain the proper planar orientation and collectively consolidating them to a high packing density in one region of the liquid surface and forming the collected flake into a sheet.

The invention is now specifically described with reference to the accompanying drawings, FIGS. 1 – 2.

FIG. 1 is a copy of a blown-up photomicrograph of a portion of a sheet of silicon carbide flake in plastic matrix M indicating the high density of packing of flake in the sheet, consistent with essentially single flake thickness throughout the sheet. The silicon carbide flakes, per se, are of the type described in U.S. Pat. No. 3,025,192 to Lowe. Boron carbide flakes useful for the same purpose can be produced as described in my copending Ser. No. 581,791, filed Sept. 26, 1966, now abandoned.

Figure 2:
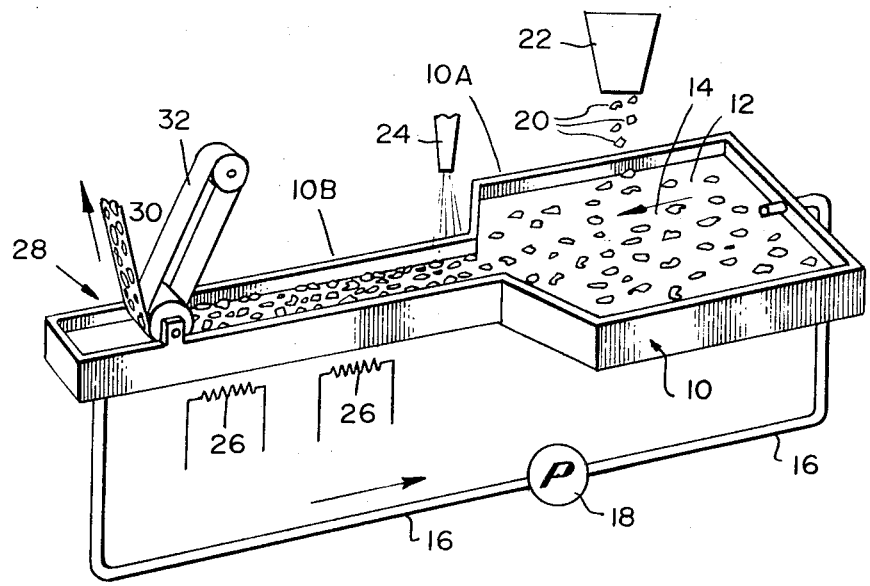

FIG. 2 is a diagrammatic representation of apparatus for making the sheets on a continuous basis. In this apparatus, an elongated trough 10 contains a flowing pool 12 of molten mercury moving in the direction indicated by the arrow 14. The mercury is continuously recirculated by a return line 16 and pump 18. Silicon carbide flake is dumped into the pool at one section 10A from a hopper 22. The flake rights itself in the mercury and lays flat on the mercury pool and moves with it.

The pool moves to a narrow section 10B of the trough where the flake are concentrated to the density indicated in FIG. 1. In the narrow section, a resin binder is sprayed on the flake from a nozzle 24. Further downstream, heaters 26 are provided to cure the resin to a solid film. The film is removed at 28 passing over a roller 30. The roller can be lubricated or provided with an intermediate sheet of plastic 32 coated with a silicone parting agent.

The resin used in the apparatus of FIG. 2 may be any non-thermoplastic adhesive material having a B-stage. Thermoplastic resins may be used if the apparatus is modified in the addition of cooling means between heaters 26 and take-off roll 30. Preferably, a resin of the composition bisphenol A-epichlohydrin, such as the well known PKSB–8085 adhesive is used.

The rates of flow of the molten pool is non-critical. However, it should be only slightly greater than the rate of removal of the film to cause a log-jam build-up at the junction of portions 10A and 10B of the trough 10.

There are several permissible variations within the scope of the invention aside from the above described distinctly advantageous method.

First, the flake can be floated on a still pool of mercury and a sheet of paper can be dragged over the flake surface to concentrate them. The flake of FIG. 1 where concentrated in this fashion.

Second, removal of concentrated flake can be by way of an adhesive coated substrate which is lowered to the flake and heated, if necessary, to effect at least sufficient bonding for the concentrated flake to adhere to the substrate. Reference to a "single flake thickness sheet" as used herein includes this type of underlying matrix support as well as the above described matrix support.

Third, various other adhesives or matrices and other liquid floating media such as lead bismuth and other alloys can be used so long as the two are immiscible and the liquid floating medium is of higher density than the flake. Also, flake of other materials such as glass and mica can be formed into single flake thickness sheet by the present method.

In making laminates, several of the single sheet thickness flakes can be stacked and heated or pressed to effect bonding of adjacent layers. It is also convenient to coat each layer with a high strength adhesive such as epoxy resin before laminating.

In a variation of the laminating technique the matrix material used in forming the sheets can be removed and the laminate reimpregnated. For instance, a stack of sheets can be formed and clamped between mesh covers. Then the matrix (or substrate) can be removed by heating the laminate in vacuum or dipping into a molten salt bath. The high density packing of the flake prevents collapse of the package. Then the package can be impregnated, say with a metal matrix, by dipping in a molten metal bath under vacuum. An alternate technique is to coat the sheet with metal and then remove the organic matrix or substrate in solvents or by burning off.

Other variations within the scope of the present invention will be obvious to those skilled in the art from reading the foregoing. It is therefore intended that the above disclosure and accompanying drawings shall be read as illustrative and not in a limiting sense.

What is claimed is:

1. A process for making sheets of planar silicon carbide or boron carbide material comprising the steps of floating the flakes on the surface of a pool of liquid metal which is inert to the flakes, concentrating the flakes together on the surface of the pool, bonding the concentrated flakes together on the surface of the pool thereby forming a sheet thereof and withdrawing the sheet from the surface of the pool.

2. The process of claim 1 combined with the further step of stacking together repeating units of the sheet and bonding them together to form a laminate.

* * * * *